(12) United States Patent
Mohr et al.

(10) Patent No.: US 8,817,491 B2
(45) Date of Patent: Aug. 26, 2014

(54) ELECTRIC POWER CONVERSION SYSTEM HAVING AN ADAPTABLE TRANSFORMER TURNS RATIO FOR IMPROVED EFFICIENCY

(75) Inventors: David Paul Mohr, Spring, TX (US); Mohamed Amin Bemat, Cypress, TX (US); Reynaldo P Domingo, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 23 days.

(21) Appl. No.: 13/263,658

(22) PCT Filed: Apr. 27, 2009

(86) PCT No.: PCT/US2009/041809
§ 371 (c)(1),
(2), (4) Date: Oct. 7, 2011

(87) PCT Pub. No.: WO2010/126478
PCT Pub. Date: Nov. 4, 2010

(65) Prior Publication Data
US 2012/0033469 A1    Feb. 9, 2012

(51) Int. Cl.
*H02M 3/335* (2006.01)
*G05F 1/14* (2006.01)
*G05F 1/16* (2006.01)

(52) U.S. Cl.
USPC .............................. 363/17; 323/255; 323/258

(58) Field of Classification Search
CPC ............ H02M 3/33569; H02M 3/335; H02M 3/3376; H02M 7/48; H02M 7/5387; H02M 7/53871; H02M 2001/0022; H01F 29/02; H01F 29/04; H02P 13/06; G05F 1/14; G05F 1/20; G05F 1/30
USPC ........... 323/255, 258, 256; 363/17, 20, 21.01, 363/21.04, 21.1, 98, 132
See application file for complete search history.

(56) References Cited

U.S. PATENT DOCUMENTS 5,010,469 A * 4/1991 Bobry .............................. 363/37
5,507,456 A * 4/1996 Brown et al. ............. 246/167 R (Continued)

FOREIGN PATENT DOCUMENTS

CN    101919147 A    12/2010

OTHER PUBLICATIONS

Lasantha B. Perera et. al., "Multi-Level Current Reinjection in Double-Bridge Self-Commutated Current Source Conversion" 2005 IEEE Transactions on Power Delivery, 984-991, Apr. 2005.

(Continued)

*Primary Examiner* — Timothy J Dole
*Assistant Examiner* — Ivan Laboy Andino

(57) ABSTRACT

An electric power conversion system has an adaptable transformer turns ratio for improved efficiency. The transformer has multiple taps on its primary. Switching circuitry is configured to connect an energy source to the taps in at least two modes such that the transformer operates with a first primary-to-secondary turns ratio in the first mode and with a second primary-to-secondary turns ratio in the second mode. The first turns ratio is greater than the second turns ratio. Control circuitry is configured to operate the switching circuitry in the first mode when a voltage level of the energy source is above a first threshold and to operate the switching circuitry in the second mode when the voltage level is below a second threshold.

11 Claims, 4 Drawing Sheets

(56) References Cited

U.S. PATENT DOCUMENTS

| | | |
|---|---|---|
| 5,546,294 A | 8/1996 | Schutten |
| 5,895,982 A | 4/1999 | Eng |
| 6,011,704 A * | 1/2000 | Coleman ............... 363/37 |
| 6,424,229 B1 * | 7/2002 | Justice et al. ............ 331/4 |
| 6,538,909 B2 * | 3/2003 | Goodarzi et al. ........ 363/98 |
| 7,365,602 B2 | 4/2008 | Bhatti |
| 8,106,636 B2 * | 1/2012 | Asinovski et al. ....... 323/258 |
| 2002/0006046 A1 | 1/2002 | Rivas Saiz et al. |
| 2007/0183170 A1 | 8/2007 | Nakahori |

OTHER PUBLICATIONS

Qing Chen et. al., "Design Trade-Offs for 5-V Output Off-Line Zero-Voltage-Switched PWM Converters" 1991 IEEE Telecommunications Energy Conference, pp. 616-623, Nov. 1991.

\* cited by examiner

US 8,817,491 B2

ELECTRIC POWER CONVERSION SYSTEM HAVING AN ADAPTABLE TRANSFORMER TURNS RATIO FOR IMPROVED EFFICIENCY

FIELD OF THE INVENTION

This invention relates generally to electric power supplies.

BACKGROUND

An electric power supply is a device or system that is capable of providing electrical energy to a load-typically by converting electrical energy from one form to another to make the energy compatible with the load's requirements. For example, an electric power supply might convert 120 or 240 volt alternating current ("AC") energy to lower-voltage, regulated direct current ("DC") energy appropriate for use by an electronic device such as a computer system. Sometimes power supplies are integrated with the devices for which they supply energy. In other applications, power supplies are discrete components and can be internal or external to the load.

Switching electric power supplies (also known variously as switch-mode power supplies, switched-mode power supplies and other similar terms) are those that make use of active switching circuitry along with inductive elements to accomplish the energy conversion task with a minimum of energy loss. In switching power supplies that take their input from AC mains, a common configuration is to employ rectification circuitry and bulk capacitors to create a DC supply from the available AC input. This DC supply is then provided to one or more switching DC-DC conversion systems that generate desired DC output levels.

An important category of electric power supplies are those that provide electrical isolation. In an isolating power supply, there is no DC circuit between an output of the power supply and the input of the power supply. For example, in an isolating power supply that generates a regulated low-voltage DC output from AC mains, there would be no DC circuit between the low-voltage DC output and the AC mains. A transformer is typically used to provide this electrical isolation. In isolating DC-DC conversion systems, a DC supply voltage is applied with alternating polarities to the primary windings of a transformer with the consequence that power is transferred to the secondary windings of the transformer. Rectification is applied to the voltage at the secondary windings.

DETAILED DESCRIPTION OF THE PREFERRED EMBODIMENTS

Figure 1:
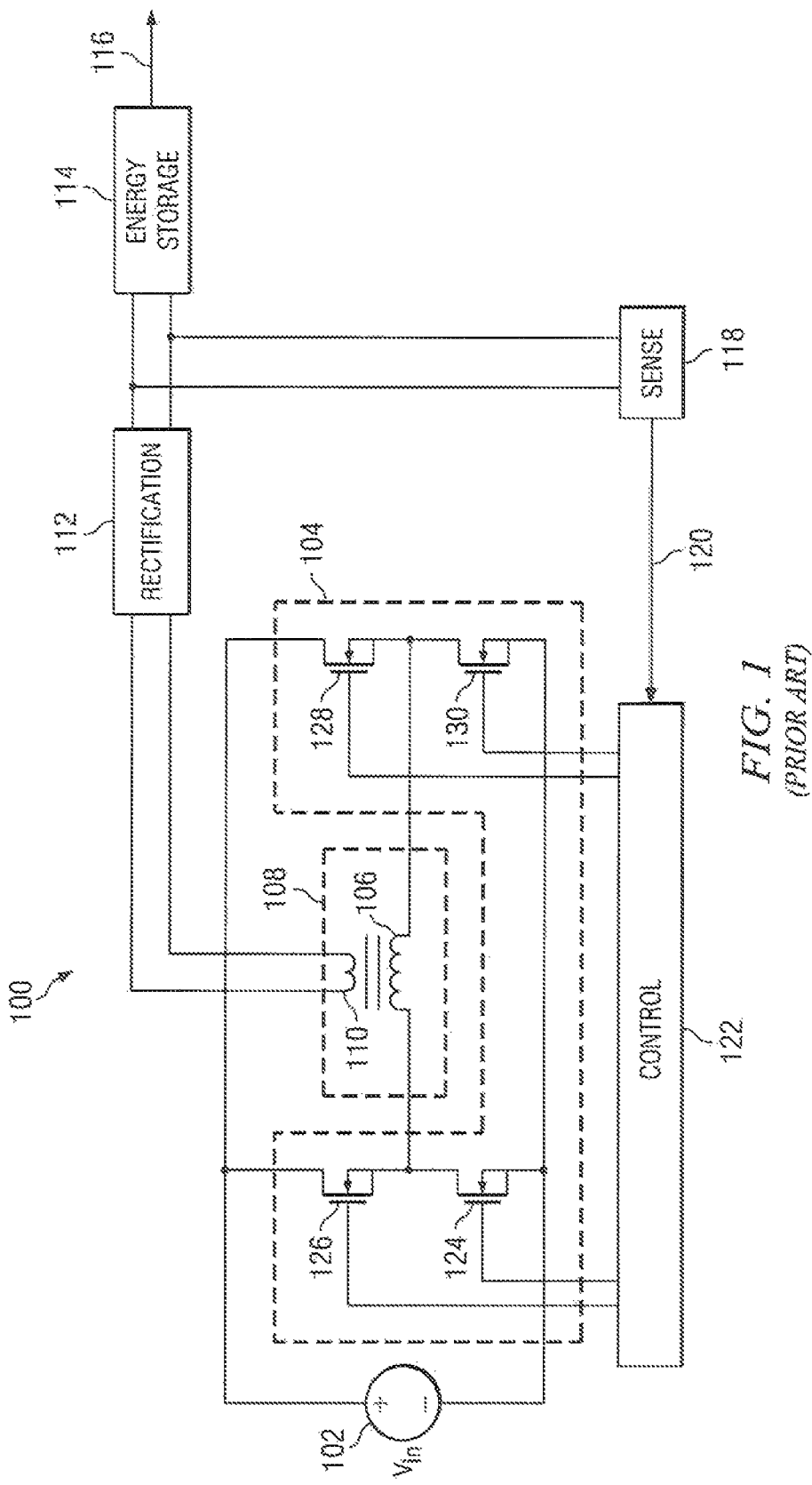
FIG. 1 is a schematic diagram illustrating a DC-DC conversion system utilizing an H-bridge circuit and a transformer according to the prior art.

FIG. 1 illustrates a prior art DC-DC conversion system 100. A DC energy supply 102 is applied to an H-bridge circuit 104, which connects source 102 to the primary 106 of a transformer 108 with alternating polarities. The resulting time-varying current in primary 106 causes potential to appear across the secondary 110 of transformer 108. This potential is converted to DC by rectification circuitry 112. The rectified DC is applied to an energy storage element 114, which is typically a bulk capacitor. The voltage on energy storage element 114 may then be used directly by a load, or may be further modified by other energy conversion systems as indicated at arrow 116. To control the DC voltage level at energy storage element 114, sense circuitry 118 may be employed. Sense circuitry 118 provides a feedback signal 120 to control circuitry 122, which can adjust the duty cycle of the switching elements in H-bridge circuit 104 to achieve a desired DC voltage level at energy storage element 114.

H-bridge circuit 104 consists of four field effect transistor ("FET") switching elements 124-130. Control circuitry 122 connects to the gates of switching elements 124-130 and typically turns on alternating diagonal pairs of the switching elements in order to apply DC energy source 102 across primary 106 with alternating polarity. For example, a first polarity application results when FETs 126/130 are turned on with FETs 124/128 turned off, and a second polarity application results when FETs 124/128 are turned on with FETs 126/130 turned off.

Figure 2:
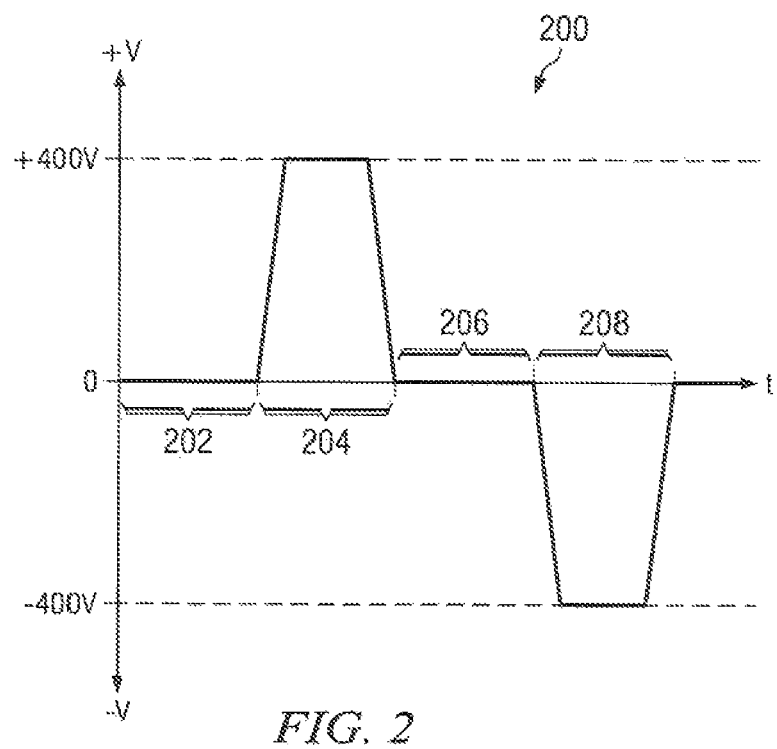
FIG. 2 is a waveform illustrating operation of the H-bridge circuit and transformer of FIG. 1 at a first duty cycle.
Figure 3:
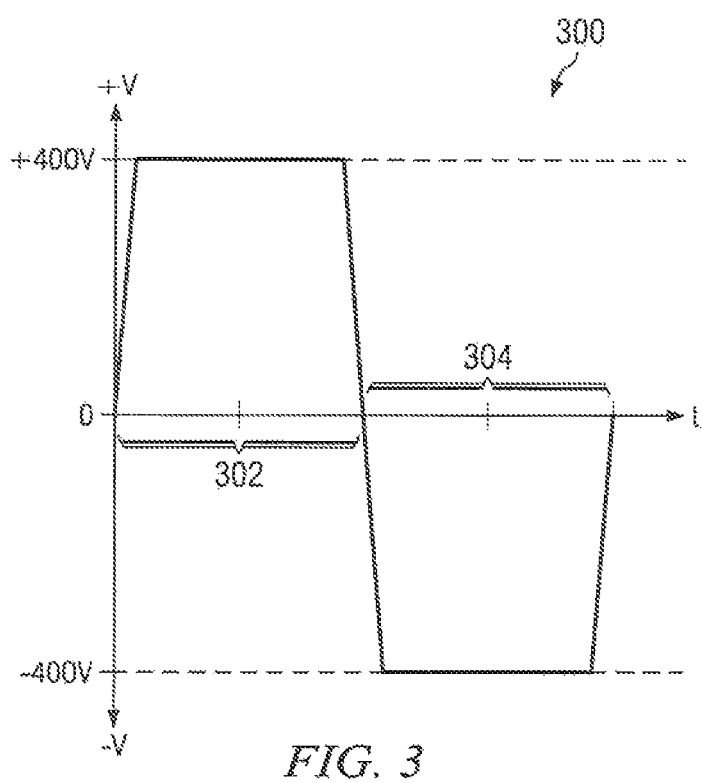
FIG. 3 is a waveform illustrating operation of the H-bridge circuit and transformer of FIG. 2 at a second duty cycle greater than the first duty cycle.

Within limits, control circuitry 122 can maintain a relatively constant average DC voltage level at energy storage element 114 by varying the duty cycle of switching elements 124-130 either in discrete increments or continuously in response to feedback signal 120. One of several methods for controlling the duty cycle is by a pulse width modulation technique illustrated in FIGS. 2 and 3. Waveform 200 shown in FIG. 2 illustrates a duty cycle of around 25%. In this mode, all of switching elements 124-130 are turned off during intervals 202 and 206 so that no energy is applied to primary 106 at these times. During interval 204, two of the switching elements are turned on to produce a first polarity application of energy to primary 106. During interval 208, the other two switching elements are turned on to produce a second polarity application. When conduction times and non-conduction times are equal, the result is a 25% duty cycle. Waveform 300 in FIG. 3 illustrates a duty cycle of around 50%. In this mode, there is essentially no time during which one of the diagonal pairs of switching elements is not conducting. Instead, energy is applied to primary 106 with a first polarity during interval 302 and with a second polarity during interval 304. Normally, the DC voltage level at energy storage element 114 will vary proportionally with the duty cycle, reaching its maximum at 50% duty cycle and declining at lower duty cycles.

But the inventors hereof have discovered a problem with prior art systems such as system 100: By design, they typically operate at duty cycles substantially lower than 50%, whereas greater efficiency can be achieved at duty cycles closer to 50% due to the reduced dead time at higher duty cycles. The reason why prior art systems operate primarily at lower duty cycles is that an energy conversion system such as system 100 must be designed to tolerate a range of input voltages supplied by energy source 102. While an expected operating point for the voltage across source 102 might be 400VDC, for example, system 100 must nevertheless be able to tolerate a significantly lesser input voltage-say 300VDC, which might occur temporarily during a brown out condition and still be able to maintain the desired DC voltage level at energy storage element 114. Prior art system 100 must do so solely by varying the duty cycle of switching elements 124-130 as just described. For this reason, designers fix the turns ratio in transformer 108 for prior art systems by determining how much voltage can be produced at energy storage element 114 when H-bridge circuit 104 is operated at maximum (50%) duty cycle and when the voltage supplied by source 102 is at its minimum. As a consequence, prior art system 100 only operates near 50% duty cycle during temporary and unusual circumstances where the voltage at source 102 is at a minimum. During far more common circumstances, when the voltage at source 102 is at its normal (higher) operating point, system 100 must operate at a substantially lower and more inefficient duty cycle in order to maintain the correct DC level at energy storage element 114.

Figure 4:
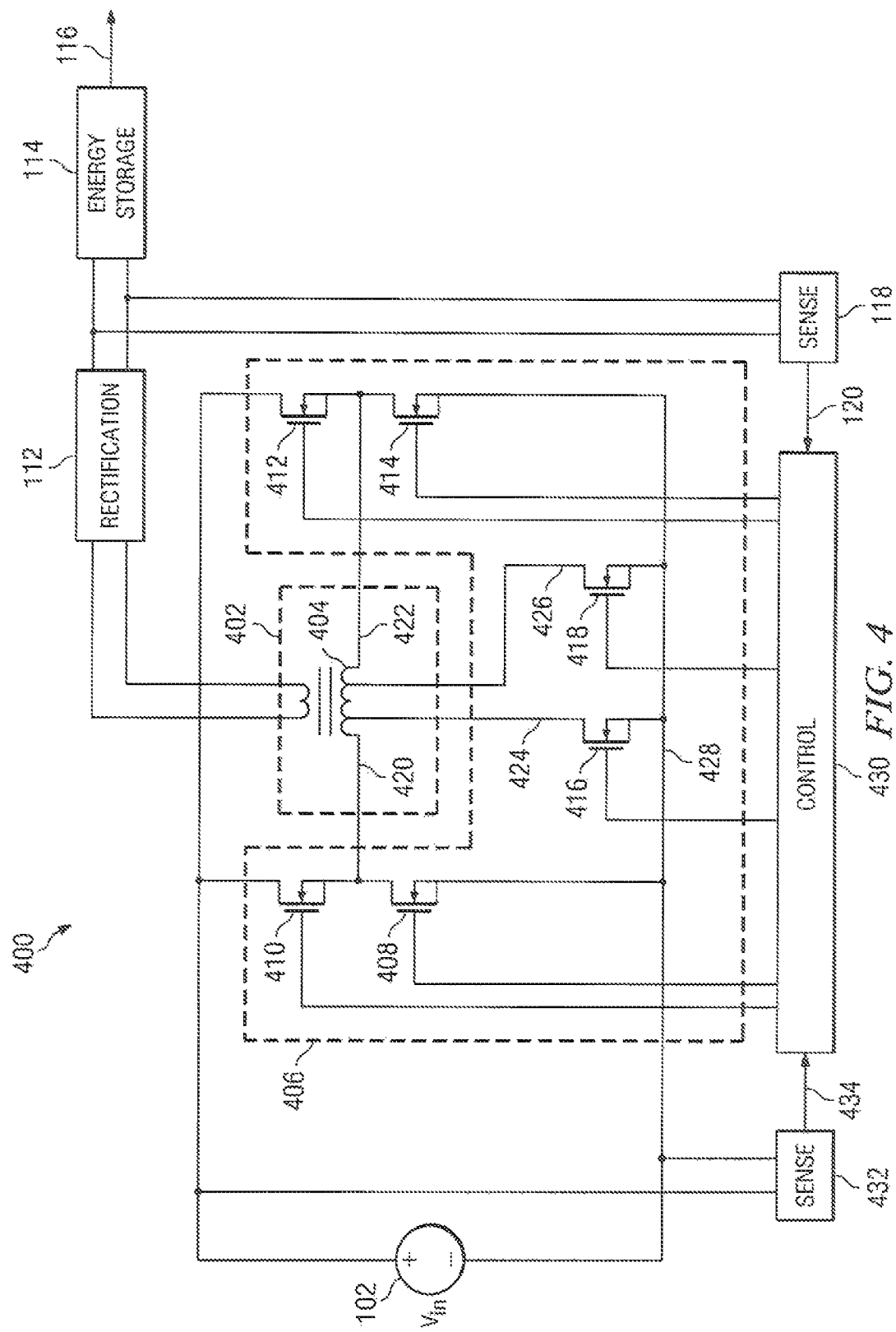
FIG. 4 is a schematic diagram illustrating an electric power conversion system according to a preferred embodiment of the invention.

Inventive energy conversion system 400 shown in FIG. 4 constructively addresses this problem and allows operation at higher duty cycles even during the common circumstance when the voltage at source 102 is at its normal operating point. It does so by dynamically varying the turns ratio in transformer 402. Primary 404 of transformer 402 is provided with multiple taps as shown. Switching circuitry 406 includes four switching elements 408-414 forming an H-bridge with primary 404. First terminals of switching elements 408 and 414 are connected to primary 404 at taps 420 and 422, respectively. Second terminals of switching elements 408 and 414 are connected at a node 428. Another two switching elements 416 and 418 are added. First terminals of switching elements 416 and 418 are connected to primary 404 at taps 424 and 426, respectively. Second terminals of switching elements 416 and 418 are also connected at node 428.

Inventive control circuitry 430 is configured to operate in at least two modes. In the first mode, switching elements 416 and 418 do not conduct at all, while the H-bridge circuit formed by switching elements 408-414 may operate in a conventional way such that pairs 408/412 and 410/414 conduct alternately. Specifically, pair 410/414 conducts while pair 408/412 does not, and then pair 408/412 conducts while pair 410/414 does not. In the second mode, switching elements 408 and 414 do not conduct at all, and pairs 410/418 and 412/416 conduct alternately. Specifically, pair 410/418 conducts while pair 412/416 does not, and then pair 412/416 conducts while pair 410/418 does not.

Note that the two sets of switching elements 410/414 and 410/418 both contain switching element 410. Similarly, the two sets of switching elements 412/408 and 412/416 both contain switching element 412. Note also that the two pairs of taps 420/422 and 420/426 both contain tap 420. And the two pairs of taps 420/422 and 422/424 both contain tap 422.

The number of turns between pair of taps 424/422 may be the same as the number of turns between pair of taps 420/426. The number of turns between pair of taps 420/422 is greater than the number of turns between either pair 424/422 or pair 420/426. Consequently, when control circuitry 430 is operating in the first mode, the turns ratio of transformer 402 is determined by the turns between taps 420 and 422. But when control circuitry 430 is operating in the second mode, the turns ratio is determined by the turns between taps 420 and 426, or equivalently between taps 422 and 424. Thus the primary-to-secondary turns ratio for transformer 402 is greater in the first mode than in the second mode.

Sense circuitry 432 may be provided to sense the voltage level Vin across energy source 102. Sense circuitry 432 may provide a control signal 434 to indicate the level of Vin to control circuitry 430.

Figure 5:
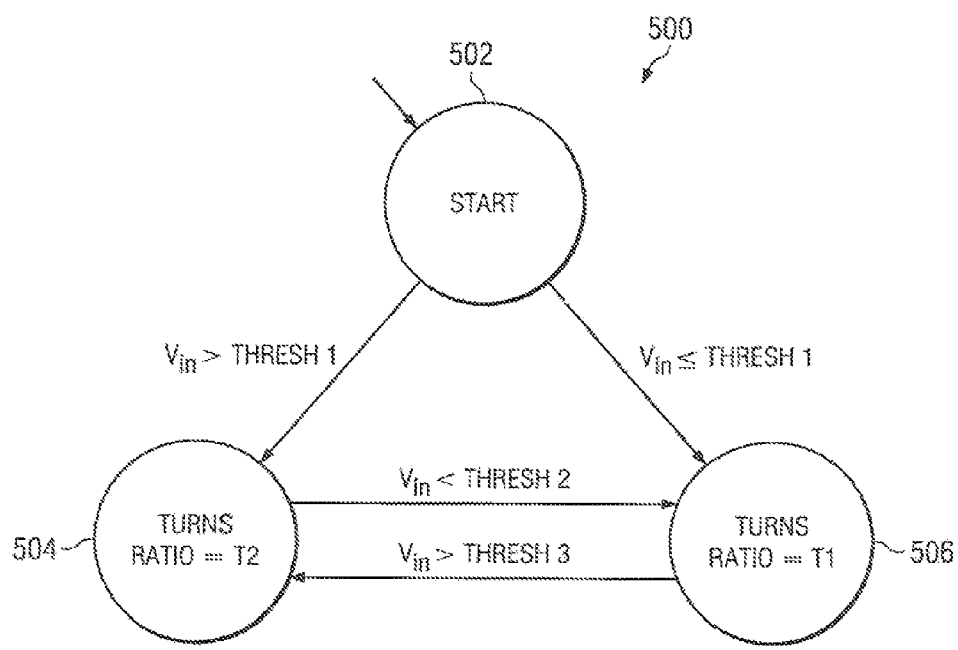
FIG. 5 is a state diagram illustrating preferred behavior for the electric power conversion system of FIG. 4.
Figure 6:
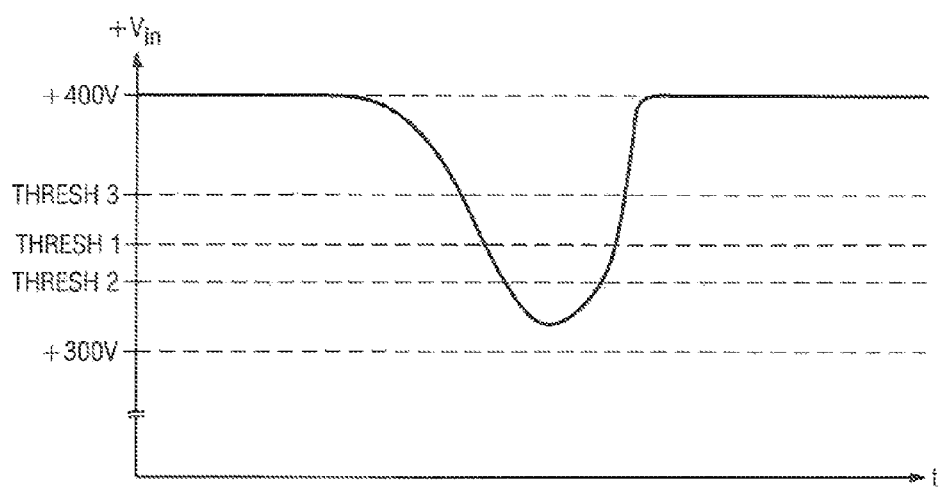
FIG. 6 is a graph illustrating one example of numerous time-varying input voltages to which systems according to preferred embodiments of the invention may usefully adapt.

State diagram 500 in FIG. 5 and the waveform shown in FIG. 6 are provided by way of example to illustrate one of numerous beneficial applications for inventive system 400. Any suitable means can be employed to determine the turns ratio at which the circuit will be operated initially. In the illustrated example, the system initializes in start state 502, and control circuitry 430 then enters either state 504 or 506 depending on whether or not Vin exceeds a voltage threshold Thresh1. (In the illustration of FIG. 6, voltage threshold Thresh1 is shown between voltage thresholds Thresh2 and Thresh3. In other embodiments, Thresh1 may be chosen differently.) State 506 preferably corresponds to the first mode of operation described above, and state 504 preferably corresponds to the second mode, such that the primary-to-secondary turns ratio T1 in state 506 is higher than the primary-to-secondary turns ratio T2 in state 504.

State 506 would typically correspond to the common case in which Vin is at or near its normal operating point. State 504 would typically correspond to the case in which Vin is lower than normal for some reason, such as it would be temporarily during a brown out condition. While in state 506, if Vin is sensed to drop below Thresh2, the system transitions to state 504 to operate at the lower turns ratio T2. While in state 504, if Vin is sensed to rise back above Thresh3, the system transitions to state 506 to operate at the higher turns ratio T1. When Thresh3 is higher than Thresh2, hysteresis is provided to help prevent oscillation. In other embodiments, Thresh3 and Thresh2 may be the same.

While the invention has been described in detail with reference to preferred embodiments thereof, the described embodiments have been presented by way of example and not by way of limitation. It will be understood by those skilled in the art and having reference to this specification that various changes may be made in the form and details of the described embodiments without deviating from the spirit and scope of the invention as defined by the appended claims.

The word "tap" is used herein to refer both to internal taps of a transformer winding as well as to the end terminals of the transformer winding. Although transformer 402 of inventive system 400 was illustrated herein as having a primary with four taps, other embodiments may be constructed with more or fewer taps, and a correspondingly lesser or higher number of switching elements. For example, a minimalist embodiment can be constructed using a transformer with three taps, wherein only one switching element instead of two would need to be added to the H-bridge arrangement. And further embodiments utilizing more than four taps can be utilized, with correspondingly more states in control circuitry 430, to vary the turns ratio of transformer 402 with a higher degree of resolution.

Although embodiments of switching circuitry 406 have been illustrated using FETs as switching elements, any suitable switching elements may be used. Moreover, the specific voltage levels (e.g. 400VDC and 300VDC) that were used to support the discussion herein were chosen for the sake of example only. Embodiments of the invention may be designed for any realistic operating points. In addition, although transformer 402 was illustrated as a step-down transformer, embodiments of the invention are not limited to step-down transformers or to transformers having the specific turns ratio illustrated in the drawings. Embodiments of the invention may be deployed in any appropriate electrical system, including switching or other types of electrical power supplies. However, embodiments of the invention are not limited to DC-DC conversion systems as illustrated in FIG. 4.

Thus, rectification circuitry 112, energy storage element 114 and sense circuitry 118 are not necessary in all embodiments of the invention.

In the appended claims and in the foregoing written description, the words "comprising" and "comprises" are to be read in the open sense to mean "including the following elements but not excluding others."

What is claimed is:

1. A system, comprising:
a transformer having at least four taps on its primary;
four switching elements forming an H-bridge with the primary, wherein first terminals of the first and fourth switching elements are connected to the first and fourth taps, respectively, and second terminals of the first and fourth switching elements are connected at a node;
fifth and sixth switching elements, wherein first terminals of the fifth and sixth switching elements are connected to the second and third taps, respectively, and second terminals of the fifth and sixth switching elements are connected at the node; and
a controller configured to operate in at least two modes such that, in the first mode, the first and fourth switching elements alternately conduct to produce a complete output waveform and the fifth and sixth switching elements remain turned off, and in the second mode, the fifth and sixth switching elements alternately conduct to produce the complete output waveform and the first and fourth remain turned off.

2. The system of claim 1, further comprising:
sense circuitry configured to sense a voltage level applied to the H-bridge; and
wherein the controller is configured to operate in the first mode when the voltage level is above a first threshold, and to operate in the second mode when the voltage level is below a second threshold.

3. The system of claim 2, wherein:
the first threshold is greater than the second threshold.

4. The system of claim 2, wherein:
the first and second thresholds are the same.

5. The system of claims 1, wherein:
in the first mode, the transformer operates with a first primary-to-secondary turns ratio and, in the second mode, the transformer operates with a second primary-to-secondary turns ratio greater than the first primary-to-secondary turns ratio.

6. The system of claim 1, wherein:
the system forms a part of a switching electric power supply.

7. A method of operating an electrical power supply comprising a plurality of switching elements, including first, second, third, and fourth switching elements forming an H-bridge with a transformer primary and fifth and sixth switching elements connected to additional taps of the transformer primary, wherein a number of turns between the second and sixth switching elements is less than a number of turns between the second and fourth switching elements, the method comprising:
alternately turning on the second and third switching elements;
if a voltage level of a DC energy source exceeds a first threshold, alternately turning on the first and fourth switching elements in concert with the second and third switching elements to produce a complete output waveform while the fifth and sixth switching elements remain turned off; and
if the voltage level of the DC energy source is below a second threshold, alternately turning on the fifth and sixth switching elements in concert with the second and third switching elements to produce the complete output waveform while the first and fourth switching elements remain turned off.

8. The method of claim 7, wherein the second threshold is lower than the first threshold.

9. The method of claim 7, wherein the first and second thresholds are the same.

10. The method of claim 7, wherein the first and second switching elements are coupled to a first tap of the transformer primary, and the third and fourth switching elements are coupled to a second tap of the transformer primary.

11. The method of claim 10, wherein the fifth switching element is coupled to a third tap of the transformer primary, and the sixth switching element is coupled to a fourth tap of the transformer primary.

* * * * *

UNITED STATES PATENT AND TRADEMARK OFFICE
CERTIFICATE OF CORRECTION

| | |
|---|---|
| PATENT NO. | : 8,817,491 B2 |
| APPLICATION NO. | : 13/263658 |
| DATED | : August 26, 2014 |
| INVENTOR(S) | : David Paul Mohr et al. |

It is certified that error appears in the above-identified patent and that said Letters Patent is hereby corrected as shown below:

In the Claims

In column 5, line 40, in Claim 5, delete "claims" and insert -- claim --, therefor.

Signed and Sealed this
Third Day of March, 2015

Michelle K. Lee
*Deputy Director of the United States Patent and Trademark Office*